(12) United States Patent
Sørensen

(10) Patent No.: US 6,748,475 B1
(45) Date of Patent: Jun. 8, 2004

(54) PROGRAMMABLE SERIAL PORT ARCHITECTURE AND SYSTEM

(75) Inventor: Jørn Sørensen, Aars (DK)

(73) Assignee: Analog Devices, Inc., Norwood, MA (US)

( * ) Notice: Subject to any disclaimer, the term of this patent is extended or adjusted under 35 U.S.C. 154(b) by 388 days.

(21) Appl. No.: 09/706,450

(22) Filed: Nov. 3, 2000

Related U.S. Application Data

(60) Provisional application No. 60/163,816, filed on Nov. 5, 1999.

(51) Int. Cl.[7] .......................... G06F 13/00; G06F 13/42
(52) U.S. Cl. .................. 710/305; 710/105; 713/322; 370/463
(58) Field of Search .................. 710/63, 305, 100, 710/300, 315, 105; 709/250; 712/37; 370/463, 419; 713/600, 500, 322; 375/220

(56) References Cited

U.S. PATENT DOCUMENTS

| | | | |
|---|---|---|---|
| 5,371,736 A | * | 12/1994 | Evan |
| 5,442,775 A | * | 8/1995 | Whitted, II et al. |
| 5,557,751 A | * | 9/1996 | Banman et al. |
| 5,615,404 A | * | 3/1997 | Knoll et al. |
| 5,628,030 A | | 5/1997 | Tuckner |
| 5,694,555 A | * | 12/1997 | Morriss et al. |
| 5,809,091 A | | 9/1998 | Barrow |
| 6,038,400 A | | 3/2000 | Bell et al. |
| 6,128,311 A | * | 10/2000 | Poulis et al. |
| 6,389,498 B1 | * | 5/2002 | Edwards et al. |

FOREIGN PATENT DOCUMENTS

EP      0 665 502 A1      8/1995

\* cited by examiner

*Primary Examiner*—Gopal C. Ray
(74) *Attorney, Agent, or Firm*—Wolf, Greenfield & Sacks, P.C.

(57) ABSTRACT

An interface device presents a generic serial input/output (I/O) port, whose function is programmable according to a stored sequence of instructions executed by a programmable state machine. The instructions cause the programmable state machine to define operation of the serial I/O port according to a standard or other predetermined set of serial I/O communication parameters.

17 Claims, 3 Drawing Sheets

PROGRAMMABLE SERIAL PORT ARCHITECTURE AND SYSTEM

CROSS REFERENCE TO RELATED APPLICATIONS

This application claims domestic priority under 35 U.S.C. §119(e) to U.S. Provisional Patent Application Serial No. 60/163,816, filed Nov. 5, 1999, now abandoned, and incorporated herein in its entirety by reference.

BACKGROUND OF THE INVENTION

1. Field of the Invention

The present invention relates generally to interface devices for data processing and communication systems. The invention relates more particularly to serial I/O devices. Yet more particularly, the invention relates to programmable serial I/O devices.

2. Related Art

Many serial interface devices, also called serial input/output (I/O) ports, arrangements are known in the field of electronic circuits and systems. Implementations include application-specific circuits, Universal Asynchronous Receiver Transmitter (UART) devices, microprocessors with software controlled serial ports, and numerous others. Such devices are used for a wide range of applications, including communication with display devices, communication with so-called "smart" batteries for battery management, providing access to a system for debug, providing a connection to a synthesizer, communication with a modem, or serving as a universal system connector (USC). Numerous standards have been promulgated, supporting the various applications for serial I/O ports by defining the specific desired physical configurations thereof. The parameters defined can include the number and type of signal paths, the timing of signals carried by the various signal paths and other characteristics such as amplitude, polarity and encoding method of the signals and signal paths.

A designer generally selects a non-programmable serial I/O ports solution on the basis of the match between the standard or custom serial I/O ports configuration the designer desires to implement and the devices available. For example, a UART meeting certain speed and timing requirements may be selected for a particular asynchronous application.

In designs requiring greater flexibility than afforded by non-programmable devices, a software programmable serial port of a conventional microprocessor may be used. For example, the Motorola M68HC11 family of microcontrollers includes a serial port known in the art as the Motorola Synchronous Serial Peripheral Interface (SPI). Such a configuration is generally shown in FIG. 1. The microcontroller 100 includes serial hardware 101 controlled by software 102, which may also communicate with a system bus 103. Serial communications occur over signal paths 104. However, such serial interfaces are disadvantageous because of several factors. Even in interfaces that are software controlled, like the SPI interface, the electrical parameters, numbers of signal paths, type of signal paths, etc. are predefined and inflexible. The processor 100 must execute a software program 102 to control the serial port, and all serial data to be sent over signal paths 104 passes through the processor 100, thus additionally loading the processor 100, above whatever load is imposed by the task for which the processor 100 is principally employed. Also, because the serial hardware 101 is a power-consuming part of the processor 100, additional power is consumed whenever the processor is executing a software program.

SUMMARY OF THE INVENTION

Therefore, it is a general object of embodiments of the present invention to provide an improved serial interface device. Particular embodiments of the invention include programmable serial I/O devices. Some embodiments of the invention may have a particular advantage in that only one programmable set of hardware is required to provide a serial interface according to any of several standard and non-standard configurations. Thus, for example, should different customers for a system require different serial interface configurations for I/O, only one set of system hardware need be designed, a device embodying the invention then being programmed to implement the serial interface configuration required for each customer, including signal paths, signal types, timing, etc.

In a system including a system bus, an interface device embodying aspects of the invention may be connected to the system bus separate from any data processor. The interface device may comprise a bus interface connected to the system bus, a programmable state machine (PSM) connected to and responsive to the bus interface, a serializer connected to the PSM and to the bus interface, and having a serial I/O port, the serializer responsive to the PSM to transfer data between the bus and the I/O port in accordance with a selected serial protocol. Variations of this embodiment are also possible. For example, the interface device may further comprise a clock controller connected to the bus interface and connected to the PSM. The clock controller may be responsive to the bus interface and the PSM to generate a clock signal on an output connected to the serializer and to the PSM. The clock controller may turn off the clock signal for a programmable period of time responsive to a PSM command, thereby reducing power consumed by the device. The clock controller may turn off the clock signal responsive to a PSM command and turn on the clock signal responsive to a signal received at the I/O port of the serializer, thereby reducing power consumed by the device when it is not communicating on the I/O port of the serializer. The interface device may further comprise a bit counter having an input and an output, each connected to the PSM and the bit counter controlled by the PSM. The PSM may further comprise a memory capable of storing a program defining operation of the interface device, and instruction execution logic responsive to the program stored in the memory, the instruction executing logic producing on signal paths connecting the PSM and the serializer control signals through which the PSM controls the serializer. The serializer may further comprise plural I/O signals defining the serial I/O port, whose functions are defined by execution in the PSM of the program in the PSM memory. The plural I/O signals may further comprise a data signal whose signal characteristics are defined by the program. The characteristics defined may include timing or the data encoding method. In general, different programs define operation of the interface device in accordance with different serial interface standards.

According to another embodiment of aspects of the invention, a method of serial communication includes providing plural, general-purpose serial I/O signals, and programming a programmable state machine (PSM) outside of a general purpose processor to cause the general-purpose serial I/O signals to operate in accordance with a particular serial communication specification. The method may further include providing a clock signal to synchronize operation of the serial I/O signals and the PSM, and selectively turning off the clock signal when not needed, thereby reducing power consumed using the method. The method may also include turning off the clock signal responsive to a PSM command and turning on the clock signal responsive to a signal received by one of the general-purpose I/O signals. The method may further include causing the plural I/O signals to operate with a defined timing or to operate with a defined data encoding method.

BRIEF DESCRIPTION OF THE DRAWINGS

In the drawings, in which like reference designations indicate like elements.

DETAILED DESCRIPTION

Figure 1:
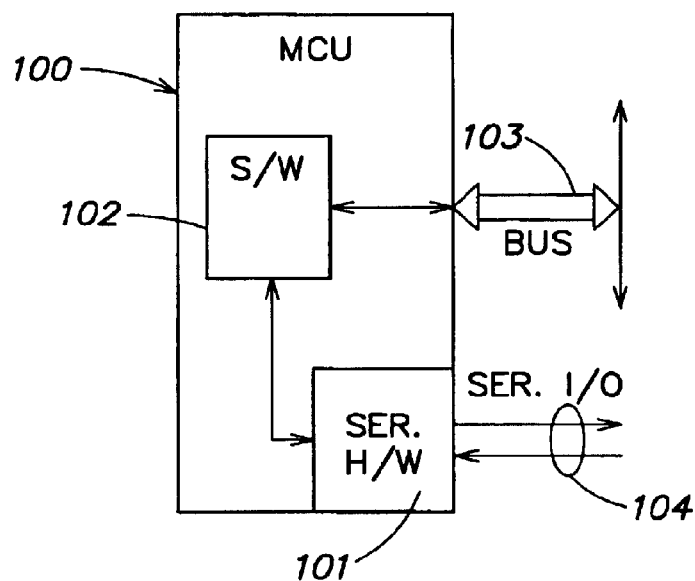
FIG. 1 is a schematic block diagram of a conventional serial I/O device.

The present invention will be better understood upon reading the following detailed description of an embodiment and variations thereof in connection with the drawings.

The illustrative embodiment of an interface device 200 shown in FIG. 2 includes a bus interface block 201, a programmable state machine (PSM) 202, serialization hardware 203, a clock controller and/or clock generator block (for simplicity's sake referred to hereinafter as the clock control block or CCB, without loss of generality) 204 and a bit counter 205. These five basic elements are interconnected as follows. The bus interface block 201 is connected to a system bus 206. Commands and responses may be transferred by the bus interface block 201 between the PSM 202 and the system bus 206 as required. Commands received by the bus interface block 201 from the system bus 206 may also be transferred to the CCB 204, as required. Data is transferred by the bus interface block 201 between the serialization hardware 203 and the system bus 206. The PSM 202 executes a software program by which it generates command signals which control operation of the serialization hardware 203, the clock controller and clock generator 204 and the bit counter 205, as well as responses and other outputs handled by the bus interface block 206. The interface provided by the interface service 200 to the external world is serial I/O signals 208.

Figure 2:
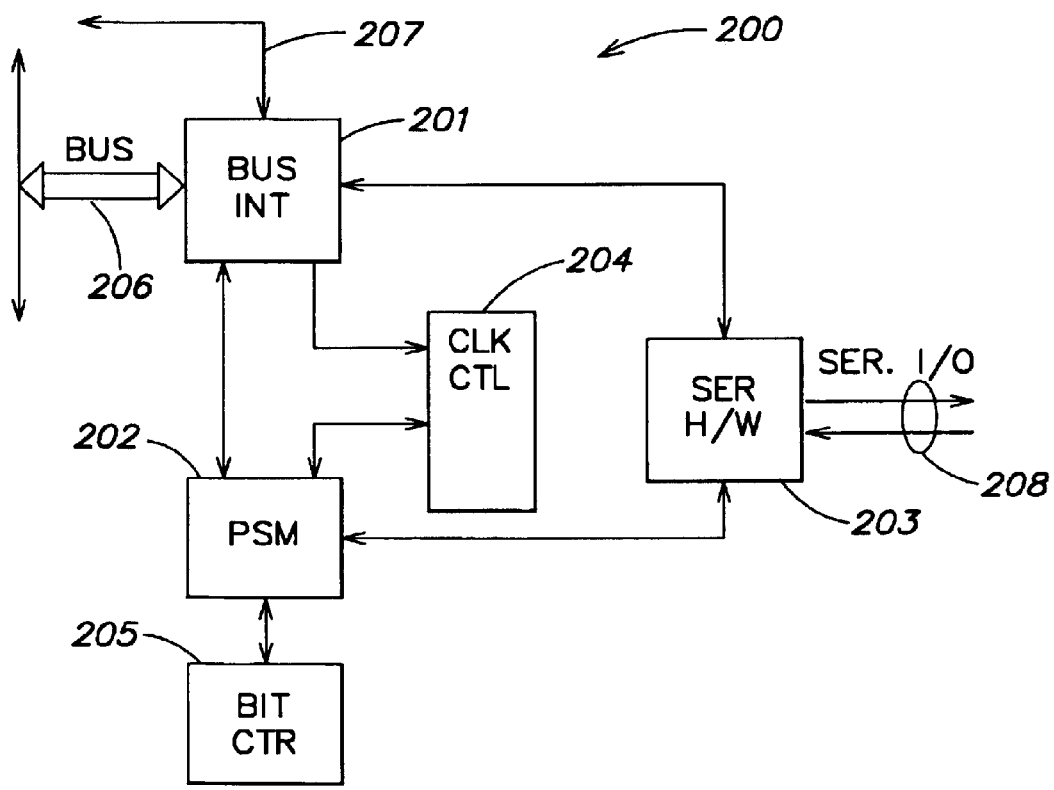
FIG. 2 is a schematic block diagram of an embodiment of a serial I/O device incorporating aspects of the present invention.
Figure 3:
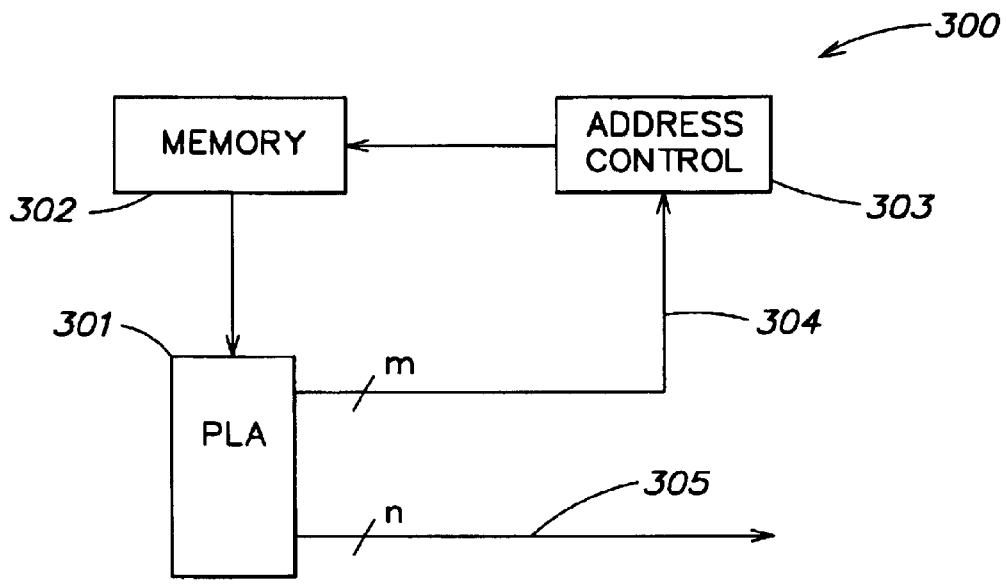
FIG. 3 is a schematic block diagram of the programmable state machine usable in the embodiment illustrated in FIG. 2.

Each of the blocks shown in FIG. 2 is now described in greater detail, as they are constructed in the illustrative embodiment.

The bus interface block 201 provides outside access to the interface device 200. The bus interface block 201 connects the interface device 200 to the system bus 206 and to other outside signals 207. The signals may include bus control signals such as a bus clock, chip select, address signals, data signals, etc. The bus clock may also be the system clock, or that signal may be distributed as a separate signal. The system bus 206 or outside signals 207 may also carry interrupt signals, such as may be used to indicate a transmit event or a receive event, etc., which are connected to the interface device 200 through the bus interface block 201. The bus interface block 201 may also receive a system reset signal, as well as other external signals 207 not part of the system bus 206, but required by the interface device 200.

The bus interface block 201 may simply receive and buffer signals, which are then communicated to the internal elements requiring them. Alternatively, the bus interface block may latch the signals before communicating them to the internal elements requiring them, or the signal values at a determined point in time may be loaded into registers. The bus interface block 201 may use any or all of these techniques in the manner known in the art, in order to supply the interface device 200 elements with the information needed to perform their respective functions.

The outputs of the bus interface block 201 include signals for configuring and controlling each element of the interface device 200. For example, there may be a reset signal responsive to the system reset signal mentioned above. There may be a signal designating a clock prescale value, whose purpose is discussed further below. A clock control signal may command the CCB 204 to turn the clock on or off. A register may hold values designating parameters for the serialization hardware 203, such as parity, the number of bits in the shift registers and status information. The bus interface block 201 may further include one or more memory locations that together form a transmit and/or receive buffer for the serialization hardware 203. The bus interface block 201 may include one or more registers through which program commands and data can be transferred to the PSM 202. The bus interface block 201 may further include other signals for controlling I/O operations on the external signals mentioned above, as well as on the system bus 206 and through the serialization hardware 203. Some parameters and settings may be controlled by values held in registers loaded by the PSM 202, as described below.

The programmability of the interface device 200 is provided by the PSM 202. However, it should be noted that the PSM 202 does not include an arithmetic logic unit (ALU) or other circuits conventionally associated with microprocessors, digital signal processors or other general purpose computing engines, although that possibility is not precluded. The PSM 202 sequences predefined operations to be performed, rather than computing arithmetic results that define operations or parameters thereof.

The PSM 202 includes three main circuits, a programmable logic array (PLA) 301, memory 302 and address control 303. Some number, m, of the PLA 301 outputs 304 are fed back through the address control 303 to select the next instruction to be executed, based on the current state of the PSM 202. A remaining number, n, of the PLA 301 outputs 305 control other elements of the interface device 200, according to the state reached in the sequence of instructions executed by the PSM 202. The PLA 301 executes the instructions; the memory 302 stores the instructions. In this embodiment, the PLA 301 does not modify the instructions of the memory 302, although that possibility is not precluded. Memory 302 may include one or more registers that hold values modifiable by the PSM 202 representing some setup parameters of operation of elements controlled by the PSM 202. For example, there may be a register whose value controls serialization parameters.

Figure 4:
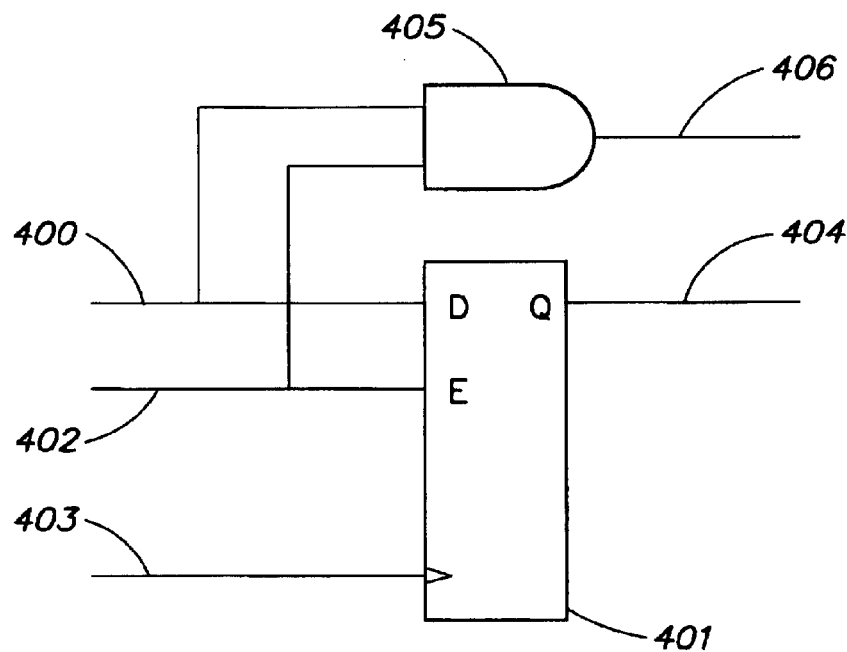
FIG. 4 is a schematic block diagram of an output circuit for the programmable state machine of FIG. 3.

Outputs of the PSM 202 may be latched or non-latched, as shown in FIG. 4. A PLA 301 output 400 is received as data by a latch 401. The latch also receives an enable signal 402 that indicates when the PLA 301 output 400 is valid. A clock 403, for example the system clock, causes the latch 401 to transfer the value of the PLA 301 output 400 to the latched output 404, if the enable signal 402 indicates that the PLA 301 output 400 is valid at the time the clock signal 403 is received. The PLA 301 output 400 may also be simply combined with the enable signal 402 using an AND gate 405 or the like, to produce a non-latched output signal 406.

The PSM 202 of the illustrative embodiment executes three classes of instruction: control instructions, program flow instructions and timing/power saving instructions. The instructions include those shown in the Table, below.

| Instruction | Brief Description |
| --- | --- |
| Group 1 | Loads a single signal with a value. |
| Group 2 | Loads a group of two signals with values. |
| Group 5 | Loads a group of five signals with values. |
| Jump Short Relative <Relative Address> | Jumps +31 or −32 bytes from the current address in memory |
| Jump Long Absolute <Absolute Address> | Jumps to the indicated absolute address in memory, storing the address following the Jump Long Absolute instruction in an Index register. |
| Jump via Index | When used in conjunction with the Jump Long Absolute instruction, implements a stack-less return from subroutine instruction. |
| Skip Next Short Instruction If <condition>, <skip number> | Skips the number of bytes indicated by the skip number, if the condition is met. |
| No Overhead Loop <loop start>, <loop end> | Causes a loop of instructions from the start byte to the end byte to be executed until the bit counter reaches a test value. |
| Wait <mask> | Waits until one of the non-masked signals becomes asserted. While waiting, the internal clock is disabled. |
| Delay <number of clock ticks> | Delays program execution for one more than the specified number of clock ticks. The internal clock is disabled during the delay. |

The serialization hardware 203 converts parallel data carried by the system bus 206 into serial data carried by serial I/O signals 208 according to a desired serial I/O standard or converts serial data carried by serial I/O signals 208 according to the desired serial I/O standard into parallel data carried by the system bus 206. Each interface device 200 according to the illustrative embodiment is a half-duplex device. In order to provide full-duplex operation, two interface devices 200 would be connected in parallel and each configured to perform the operations of one direction of the full-duplex channel.

When configured to serialize data, the serialization hardware 203 includes a shift register arranged for parallel-to-serial operation, a parity generator and output controls. When configured to receive serial data the shift register is arranged for serial-to-parallel operation. The serialization hardware 203 also uses the parity generator for receiving serial data. When receiving serial data, the serialization hardware 203 also employs an edge detector to determine when the start bit of a sequence has been received. Detection of the start bit is used, together with the Wait and Delay instructions, as described below in connection with the CCB 204 to save power when the interface device 200 is not transmitting or receiving data.

The CCB 204 of the illustrative embodiment receives a system clock from outside the interface device 200 and redistributes it to elements of the interface device 200 requiring a clock signal. Alternatively, the CCB 204 could generate a clock internally and redistribute it to elements of the interface device 200 requiring a clock signal.

Figure 5:
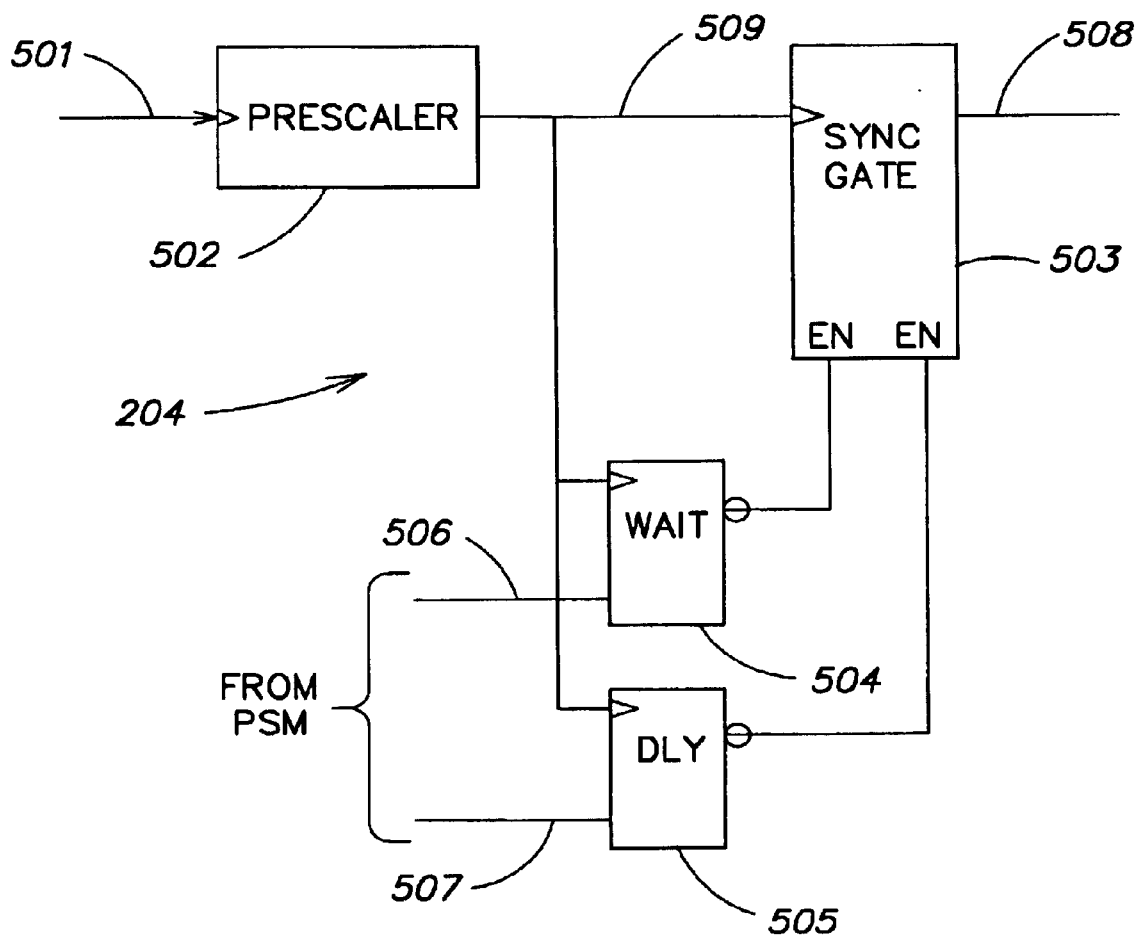
FIG. 5 is a schematic block diagram of a clock control circuit usable in the embodiment illustrated in FIG. 2.

As shown in FIG. 5, the CCB 204 receives the system clock 501 into a prescaler 502 that divides or multiplies the clock from the system rate to the rate used by the interface device 200. The prescaler 502 can be a set of programmable divider circuits or can include a phase-locked loop frequency multiplier. The output 509 of the prescaler 502 clocks a synchronization gate 503, as well as a wait latch 504 and a delay latch 505. The wait latch 504 and the delay latch 505 receive wait 506 and delay 507 commands, respectively, from the PSM 202, and latch them as enable inputs to the synchronization gate 503. The synchronization gate 503 produces the interface device clock signal 508, which can be selectively turned on and off by the wait 506 and delay 507 commands of the program executing in the PSM 202.1 The output 509 of the prescaler 502 is a clock signal internal to the CCB 204, which is not selectively turned on and off. This internal clock signal 509 is not widely distributed, hence does not impose a significant power load on the circuit, but allows the CCB 204 to determine when the wait command or delay command has terminated.

The wait instruction is particularly useful in connection with the edge detection of the serialization hardware 203. The PSM 202 can execute a wait instruction, causing the CCB 204 to shut off the clock, until an edge, i.e., a start bit, is detected by the serialization hardware 203. Execution of the software program by the PSM 202 then resumes, processing any incoming data. The wait instruction can be made to test for other signals, such as a clear to send (CTS) signal, such as used in modem applications.

The fifth element of the illustrative embodiment of interface device 200 is the bit counter 205. This counter saves programming instructions, hence memory space, because bit counting code need not be written into the loops of the software program of the PSM 202 which operate on the serial data one bit at a time. Instead, a register stores the number of bits over which to perform an operation. At the end of each loop, the PSM 202 increments the bit counter 205 via a suitable Group 1, Group 2 or Group 5 instruction and then checks the value in the bit counter 205 against that in the register storing the number of bits over which to perform the operation. Program branching and other decisions can depend on the result of this test. Alternatively, the No Overhead Loop instruction can implement all the required jumps and branches to execute a loop using the bit counter 205, using only one instruction. When such a loop completes, execution continues with the next instruction in the memory 302.

The present invention has now been described in connection with a number of specific embodiments thereof. However, numerous modifications, which are contemplated as falling within the scope of the present invention, should now be apparent to those skilled in the art. Therefore, it is intended that the scope of the present invention be limited only by the scope of the claims appended hereto.

What is claimed is:

1. In a system including a system bus, an interface device, including a programmable serial port, connected to the system bus and separate from any data processor, the interface device comprising:

a bus interface connected to the system bus;

a programmable state machine (PSM) connected to and responsive to the bus interface that sequences through an instruction set received from the bus interface; and a serializer connected to the PSM and to the bus interface, and having a serial I/O port, the serializer programmable by the PSM to transfer data between the bus and the I/O port according to a selected one of a plurality of serial protocols.

2. The interface device of claim 1, further comprising:

a clock controller connected to the bus interface and connected to the PSM, and responsive to the bus interface and the PSM to generate a clock signal on an output connected to the serializer and to the PSM.

3. The interface device of claim 2, wherein the clock controller turns off the clock signal for a programmable period of time responsive to a PSM command, thereby reducing power consumed by the device.

4. The interface device of claim 3, wherein the clock controller turns off the clock signal responsive to a PSM command and turns on the clock signal responsive to a signal received at the I/O port of the serializer, thereby reducing power consumed by the device.

5. The interface device of claim 1, further comprising:

a bit counter having an input and an output, each connected to the PSM and the bit counter controlled by the PSM.

6. The interface device of claim 1, the PSM further comprising:

a memory capable of storing a program defining operation of the interface device; and instruction execution logic responsive to the program stored in the memory, the instruction executing logic producing on signal paths connecting the PSM and the serializer control signals through which the PSM controls the serializer.

7. The interface device of claim 6, the serializer further comprising:

plural I/O signals defining the serial I/O port, whose functions are defined by execution in the PSM of the program in the PSM memory.

8. The interface device of claim 7, the plural I/O signals further comprising:

a data signal whose signal characteristics are defined by the program.

9. The interface device of claim 8, wherein the characteristics defined includes timing.

10. The interface device of claim 8, wherein the characteristics defined includes data encoding method.

11. The interface device of claim 6, wherein different programs define operation of the interface device in accordance with different serial interface standards.

12. A method, comprising:

providing data from a system bus to a bus interface connected to the system bus; and programming a programmable state machine (PSM) outside of a general-purpose processor to cause the data provided to the bus interface to be transmitted serially from a serial I/O port in accordance with a particular one of a plurality of serial communication protocols.

13. The method of claim 12, further comprising:

providing a distributed clock signal to synchronize the transfer of data from the system bus to the serial I/O port; and selectively turning off the distributed clock signal when not needed, thereby reducing power consumed using the method.

14. The method of claim 13, further comprising:

turning off the distributed clock signal responsive to a PSM command, without turning off an internal clock, and turning on the distributed clock signal responsive to a signal received at the serial I/O port.

15. The method of claim 13, further comprising:

turning off the distributed clock signal responsive to a PSM command, without turning off an internal clock, and turning on the distributed clock signal when a predetermined number of internal clock cycles have passed.

16. The method of claim 12, further comprising:

causing the data to be transmitted from the serial I/O port with a defined timing.

17. The method of claim 12, further comprising:

causing the data to be transmitted from the serial I/O port with a defined data encoding method.

* * * * *